July 20, 1965 W. H. PARKER 3,195,693
BRAKE LINING
Filed Feb. 1, 1963

INVENTOR
WARREN H. PARKER
BY
Gardner & Zimmerman
ATTORNEYS

United States Patent Office 3,195,693
Patented July 20, 1965

3,195,693
BRAKE LINING
Warren H. Parker, 1451 32nd St., Oakland 8, Calif.
Filed Feb. 1, 1963, Ser. No. 255,595
3 Claims. (Cl. 188—251)

This invention relates to the art of manufacturing brake linings, and the assembly of the linings with the brake shoes.

At the present time the preferred form of construction of brake shoe and attached brake lining assemblies comprises a metal brake shoe having an arcuate surface provided with a preformed brake lining consisting of a one piece arcuate lamination of relatively inflexible braking material thermally bonded to the braking surface of the shoe. This type of construction has been found to be most desirable because of the elimination of attaching rivets which, as is well known, inflict scoring indentations upon the brake drum after excessive wearing of the linings. Thus the use of bonded type linings has eliminated the expense of resurfacing the brake drum to attain efficient braking action. However, the use of these rigid linings has imposed certain economic disadvantages in industry in that large inventories of specially sized and shaped linings have had to be maintained in order to accommodate the relatively large number of differently shaped and sized brake shoes used on the large number of motor vehicles currently in use. Hence, it will be obvious to one skilled in this art that a definite advantage will be provided to the brake lining industry with the provision of a bondable brake lining construction which may be supplied from a single stock of lining adaptable for use with all sizes and types of brake shoes presently in use.

It is therefore an object of the present invention to provide a new and novel brake lining construction and methods of applying such brake lining constructions to a wide variety of differently sized and shaped brake shoes.

A further object of the present invention is the provision of a segmental brake lining construction which may be derived from a single stock of brake lining material to provide bondable brake linings for a wide variety of differently proportioned brake shoes.

Another object of this invention is the provision of various brake lining constructions that may be provided from a single stock of brake lining material that can be supplied in a continuous supply of brake lining material to accommodate differently proportioned brake shoes.

It is a more specific object of this invention to provide a brake lining construction and methods of utilizing such constructions wherein the brake lining is in the form of a continuous strip composed of a plurality of segmental sections of brake lining material and joined by a connecting means of the same or other material affording relative flexure between the segments whereby different lengths of said brake material can be cut from said continuous length and will conform to brake shoes of different curvatures, arcuate lengths, sizes, etc.

The manner in which the advantages of the present invention are more particularly realized and its further objects and features achieved will become more clearly apparent from the subsequent detailed description of the present invention taken with reference to the accompanying drawing in which.

The accompanying drawing is primarily intended so as to illustrate presently preferred means of constructing brake lining stock falling within the scope of this disclosure. It is to be understood that those skilled in the art to which the invention pertains may effect alterations in the embodiments of the brake linings disclosed and their methods of application by use of ordinary engineering skills without departure from the inventive concepts of this invention. Also, further equivalent means can be employed in order to accomplish the operations and structural advantages of this invention.

The invention can be briefly described in its preferred form as comprising a brake lining construction formed of a series of corresponding segmental sections of conventional brake lining material closely spaced and secured together so as to hold the segments for ready application to the shoe and proper retention therein for the bonding operation. The connection between the segments is such as to permit flexure of adjacent segments relative to another, and the curvature of the individual segments conforms to that of the average brake shoe of a fairly large range of shoes of different curvatures. Furthermore, each segment is made relatively short so that a plurality of the connected segments will be required for each shoe. In this manner, notwithstanding the relative inflexibility of the individual segments, each segment will for all practical purposes have a perfect fit for bonding with the shoe. It is preferable to have the segments connected to form a long continuous strip from which the desired length of strip for application to a particular shoe may be readily cut.

Figure 1:
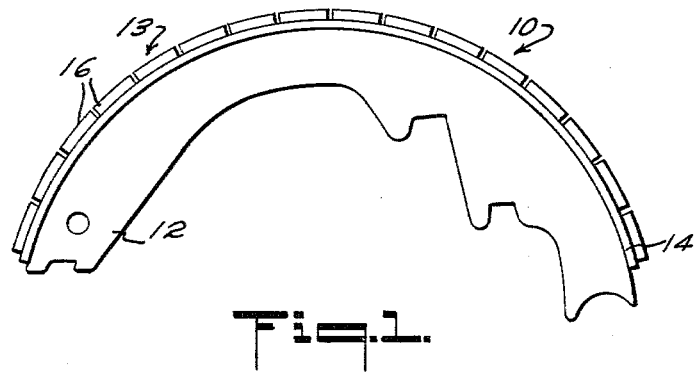
FIGURE 1 is an elevational view of a brake shoe and lining assembly embodying one form of the present invention.

The invention can be more fully understood by referring to the accompanying drawing wherein in FIGURE 1 is shown the lining 10 of my invention as applied to a conventional brake shoe 12 to provide a shoe brake and lining assembly 13. Shoe 12 includes an arcuate braking surface 14 which in brakes of different size varies accordingly.

Figure 2:
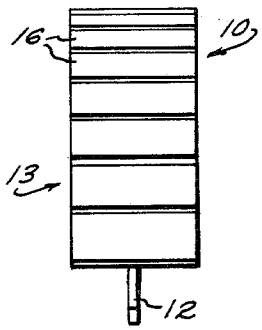
FIGURE 2 is an end view of the assembly shown in FIGURE 1.
Figure 3:
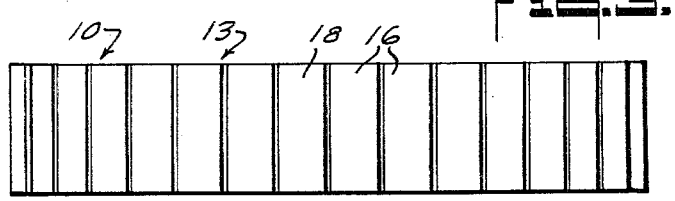
FIGURE 3 is a top view of the assembly shown in FIGURE 1.
Figure 5:
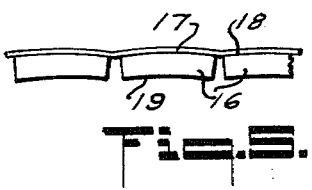
FIGURE 5 is a fragmentary side view of the brake lining strip portion showing in FIGURE 4.
Figure 4:
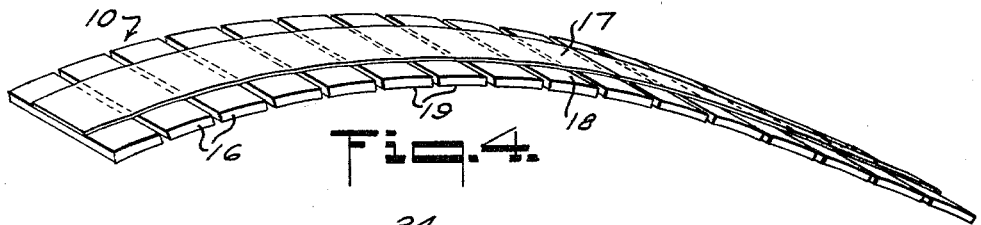
FIGURE 4 is a perspective view of the portion of the brake lining strip before it has been applied to the shoe.

The lining 10 shown in FIGURES 1 and 2 as already applied in operative position on the shoe, is in FIGURE 4 illustrated in a preferred form in which it is made up prior to being applied to and attached to the shoe. Referring now more specifically to FIGURE 4, it will be seen that the lining is formed of a plurality of arcuate sections or segments 16 which are formed of conventional braking material and preferably of the same width as the shoe surface 14. Segments 16 are of relatively short arcuate length, as will be more fully hereinafter explained, so that a multiplicity of segments will be required to cover the shoe.

As an important part of the invention, means are provided which will serve to connect the segments together or maintain same longitudinally or circumferentially aligned, and in closely spaced end to end relationship prior to being either applied to the shoe surface 14 or operatively bonded to the shoe. In the preferred form of the invention such connection of the segments is provided by one or more tapes 17 attached to each of the segments and formed of a material which will permit flexure between adjacent segments along the area or line of joindure. These tapes are positioned on the convex sides 18 of the segments and may be secured to the segments by an adhesive or other suitable fastening means. By reason of the fact that the tapes are on the outer side of the segments, there will be nothing on the inner or concave side 19 to interfere with the engagement or bonding of the lining material to the shoes in accordance with conventional methods. As will be clear the tape or tapes 17 may be allowed to remain attached to the segments during the bonding process and then removed by buffing after the bonding process has been completed.

The segments, or at least the concave side thereof, are of an arcuate curvature approximating the median of a wide range of the various curvatures conventionally utilized in the industry for the shoes. A curvature formed by a radius of the order of 5 or 5½ inches has been found suitable for the median. It has also been ascertained that by limiting the arcuate length of the segments to approximately between three-eighths and seven-eighths of an inch the contact surfaces of the individual segments practically fully conform to the arcuate surface of a wide range of brake shoe sizes. Also, it is important to note that due to the flexure permitted as aforesaid between the adjacent segments, each segment is allowed to properly contact with the shoe surface without any interference imposed by any of the adjoining or other segments. A spacing of approximately between 1/32 and 3/32 of an inch between adjacent segments has been found satisfactory. This will insure against substantial contact of the segments when operatively positioned on the shoe, as well as provide a minimum spacing between the segments at the outer circumference.

Figure 9:
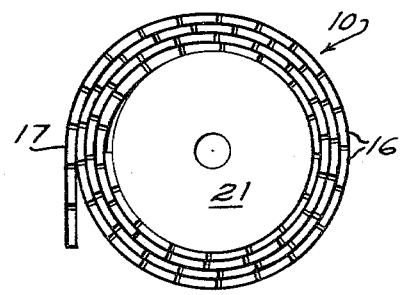
FIGURE 9 is a side elevational view of a packaging and dispensing arrangement for use particularly with the embodiments shown in FIGURES 1 and 7.

Due to the flexibility afforded between the segments, a long strip of the interconnected segments may be readily folded and stored in a small space, or as shown in FIGURE 9, the strip of segments may be wound on a dispensing spool such as indicated at 21, and then a measured length of the strip cut off appropriate for application to the particular brake shoe. The segments may be readily cut to provide for the proper length of lining. As will be understood in view of the camparatively short length of the segments, the proper length of lining for the shoe surface will be obtained by simply cutting or breaking the readily severable connecting means between appropriate segments. In some instances such as where the brake shoe size is appreciably out of the range for which the segments have been designed, it would be expedient to cut through a segment to obtain the proper length of lining section. This need can be eliminated by making the tape or other connecting means of an elastic or stretchable material, the proper length of lining section may be secured by stretching the connection and retaining it in such condition during the bonding operation.

The cut lengths can be conveniently handled without disturbing the longitudinal alignment of the segments when the lining is being applied to and mounted in operative position on the shoe surface for bonding. After the lining has been fused to the shoe, the tape can be removed by buffing or other action. It will thus be clear that linings of a size and fit to conform to practically all brake shoes will be available without the need of carrying a large inventory.

Figure 6:
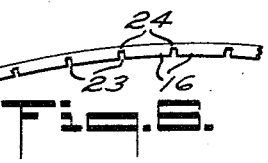
FIGURE 6 is a fragmentary section of showing another embodiment of a brake lining construction of the present invention.
Figure 7:
FIGURE 7 is a fragmentary side view of still another embodiment of the brake lining.
Figure 8:
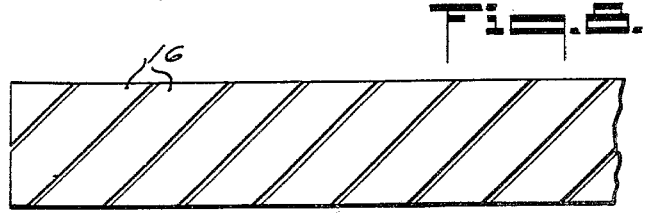
FIGURE 8 is a top view of a further embodiment of a brake lining.

In FIGURES 6 and 7 the lining is in the form of a continuous one-piece strip 22 of the lining material. That is, the segments and connections therefore are formed as an integral unit, the segments being provided by forming cuts or grooves 23 on either side of the strip at intervals corresponding with the spaces between the segments of the embodiment previously described. As will be seen, web portions 24 of the lining material are left adjacent the grooves and form the connection between the segments, and these portions are made relatively thin so that the desired flexure between adjacent segments is permitted. In FIGURE 6, the open side of the grooves is disposed on the side of the lining on which the concave surfaces of the segments are presented; whereas in FIGURE 7, the open side of the groove is on the reverse side of the strip and thus will present a continuous surface to the shoe. The grooves or spaces between the segments are not necessarily strictly perpendicular to the longitudinal axis of the strip but as shown in FIGURE 8 may extend diagonally or otherwise, and either fully or partially thereof across the strip. This form of strip is best stored in long flat strips or wound helically or spirally on the dispensing spool.

What is claimed is:

1. A lining for brake shoes having an arcuate brake-lining supporting surface, comprising; a plurality of separate segmental sections having a curved side conforming with said surface; and flexible elastic means securing said sections together in closely-spaced longitudinal alignment and permitting flexure and variable spacing between adjacent sections.

2. A brake lining comprising, in combination, a generally elongated web formed of a flexible elastic material, a plurality of relatively inflexible segments of brake lining material secured to one side of said web in longitudinally spaced relation, said segments being bondable to a brake shoe, and said web being removable from said segments after the latter are bonded to a brake shoe.

3. A brake lining as described in claim 2 wherein said segments each have a surface to be bonded to a brake shoe and an opposed friction surface, and wherein said web is secured to said opposed surface.

References Cited by the Examiner

UNITED STATES PATENTS

| | | | |
|---|---|---|---|
| 1,686,190 | 10/28 | Thompson | 188—251 |
| 1,738,291 | 12/29 | Gatke | 188—259 X |
| 1,907,483 | 5/33 | Blume | 188—251 X |
| 1,947,894 | 2/34 | Whitworth | 188—251 X |
| 2,033,968 | 3/36 | Fether | 188—25 |
| 2,380,230 | 7/45 | Gatke | 188—259 |
| 2,476,588 | 7/49 | Dreher | 156—212 |
| 2,704,267 | 3/55 | Tilden | 188—25 X |
| 2,727,845 | 12/55 | Bishop | 156—212 |
| 2,751,946 | 6/56 | Gramelspacher | 156—264 X |
| 2,781,107 | 2/57 | Smith et al. | 188—251 |

FOREIGN PATENTS 895,452   4/44   France.

EUGENE G. BOTZ, *Primary Examiner.*

ARTHUR L. LA POINT, *Examiner.*